United States Patent
Kanazawa et al.

(10) Patent No.: US 12,504,411 B2
(45) Date of Patent: Dec. 23, 2025

(54) DATA GENERATION METHOD AND DEVICE, AND DISCRIMINATOR GENERATION METHOD AND DEVICE

(71) Applicants: Shimadzu Corporation, Kyoto (JP); Osaka University, Suita (JP)

(72) Inventors: Shinji Kanazawa, Kyoto (JP); Fumio Matsuda, Suita (JP)

(73) Assignees: SHIMADZU CORPORATION, Kyoto (JP); Osaka University, Suita (JP)

( * ) Notice: Subject to any disclaimer, the term of this patent is extended or adjusted under 35 U.S.C. 154(b) by 495 days.

(21) Appl. No.: 18/010,963

(22) PCT Filed: Jun. 3, 2021

(86) PCT No.: PCT/JP2021/021184
§ 371 (c)(1),
(2) Date: Dec. 16, 2022

(87) PCT Pub. No.: WO2021/261202
PCT Pub. Date: Dec. 30, 2021

(65) Prior Publication Data
US 2023/0280317 A1    Sep. 7, 2023

(30) Foreign Application Priority Data

Jun. 23, 2020 (JP) ................. 2020-107606

(51) Int. Cl.
*G01N 30/86* (2006.01)
*G01N 30/02* (2006.01)

(52) U.S. Cl.
CPC ..... *G01N 30/8631* (2013.01); *G01N 30/8693* (2013.01); *G01N 2030/027* (2013.01)

(58) Field of Classification Search
None
See application file for complete search history.

(56) References Cited

U.S. PATENT DOCUMENTS

| 2017/0336370 A1 | 11/2017 | Noda |
| 2021/0248417 A1 | 8/2021 | Taya et al. |
| 2021/0334706 A1 | 10/2021 | Yamaguchi et al. |

FOREIGN PATENT DOCUMENTS

| JP | 2011-058930 | 3/2011 |
| WO | 2016/035167 A1 | 3/2016 |

(Continued)

OTHER PUBLICATIONS

First Office Action dated Sep. 26, 2023 issued for the corresponding Japanese Patent Application No. 2022-531651.

(Continued)

*Primary Examiner* — Walter L Lindsay, Jr.
*Assistant Examiner* — Geoffrey T Evans
(74) *Attorney, Agent, or Firm* — Muir Patent Law, PLLC (57) ABSTRACT

A data generation device according to the present invention is a data generation device configured to simulatively generate data used when creating, by machine learning, a discriminator configured to detect a peak observed in a signal waveform, the data generation device including: a parameter frequency information acquisition unit configured to acquire information on frequency of a predetermined shape parameter which characterizes a shape of a signal waveform from a plurality of signal waveforms collected only in a target field of machine learning for creating the discriminator; and a simulated waveform generation unit configured to generate a simulated signal waveform which is able to include overlapping of a plurality of peaks and noise using the information on frequency of the shape parameter, in which the simulated signal waveform is provided as data for training or evaluating machine learning.

15 Claims, 6 Drawing Sheets

(56) References Cited

FOREIGN PATENT DOCUMENTS

WO   2020/045236 A1   3/2020
WO   2020/105566 A1   5/2020

OTHER PUBLICATIONS

"Check peak waveform processing", [Online], [Searched on Dec. 2, 2019], Shimadzu Corporation (https://www.an.shimadzu.co.jp/hplc/support/lib/lctalk/23/23lab.htm) (with machine translation).
"LabSolutions InsightTM Optional Software PeakintelligenceTM", [Online], [Searched on Dec. 2, 2019], Shimadzu Corporation (https://www.an.shimadzu.co.jp/lcms/m_package/peakintelligence.htm) (with machine translation).
Goodfellow et al., "Generative Adversarial Nets", [online], [searched on Dec. 2, 2019] (https://arxiv.org/pdf/1406.2661.pdf) (publication date appears to be Jun. 10, 2014).
Radford et al., "Unsupervised Representation Learning with Deep Convolutional Generative Adversarial Networks", [online], [searched on Dec. 2, 2019] (https://arxiv.org/abs/1511.06434) (2016).
Written Opinion (ISA237) for PCT application No. PCT/JP2021/021184, dated Aug. 10, 2021 (with machine translation).

SINGLE PEAK
WAVEFORM

Fig. 8B

NOISE WAVEFORM

Fig. 8C

SIMULATED
CHROMATOGRAM
WAVEFORM

DATA GENERATION METHOD AND DEVICE, AND DISCRIMINATOR GENERATION METHOD AND DEVICE

TECHNICAL FIELD

The present invention relates to a data generation method and device for machine learning, and a discriminator generation method and device using the data generation method and device.

BACKGROUND ART

A liquid chromatograph (LC) or a gas chromatograph (GC) performs chromatographic analysis on a sample to acquire a chromatogram in which a peak corresponding to a component (generally, a compound) contained in the sample is observed. Since the position (retention time) of a peak observed in a chromatogram corresponds to a component in the sample, the component can be specified, that is, qualitatively determined from the peak position. Since the area value or height value of the peak observed in the chromatogram corresponds to the content or concentration of the component corresponding to the peak, the component can be quantitatively determined from the area value or height value of the peak. Therefore, to improve the precision in qualitative and quantitative determination based on the chromatogram, it is important to determine the position of the peak top of the peak appearing in the chromatogram and the area value or height value of the peak with high precision.

A peak waveform on a chromatogram ideally has a shape according to the Gaussian distribution. However, excessive leading or tailing may be observed in an actually obtained peak on the chromatogram due to various factors. The baseline may drift, or a plurality of peaks derived from different components may often overlap due to insufficient separation. In such various situations, it is not easy to accurately detect a peak and to determine an area value or height value of the peak with high precision, and conventionally, various methods and algorithms for peak detection have been proposed and put to practical use.

For example, Non Patent Literature 1 discloses a waveform processing method in which an appropriate base line correction line is set for a given chromatogram, overlapping peaks are appropriately separated on the basis of the base line correction line, and the area value of each of the separated peaks is calculated.

Such a conventional peak detection method is based on the premise that the state of the waveform is relatively good, such as that the noise is relatively small and that the signal is steady. Therefore, when such a condition is not satisfied, accurate peak detection cannot be performed in many cases.

On the other hand, in recent years, with rapid progress of machine learning techniques such as deep learning, attempts have been made to use machine learning for automatic detection of peaks on a chromatogram. In the peak detection method using machine learning, a discriminator for peak detection is generated in advance by performing learning using a lot of chromatogram waveforms and correct answer information including feature values such as accurate positions, area values, and height values of peaks observed in the chromatogram waveforms as teacher data (also referred to as training data or learning data). Then, when a chromatogram waveform to be analyzed is input, discriminating processing using the discriminator is performed to detect a peak and calculate a feature value of the peak detected.

CITATION LIST

Non Patent Literature

Non Patent Literature 1: "Check peak waveform processing", [Online], [Searched on Dec. 2, 2019], Shimadzu Corporation, Internet Non Patent Literature 2: "LabSolutions Insight™ optional software Peakintelligence™ LC/MS/MS method package for primary metabolites and cell culture profiling", [Online], [Searched on Dec. 2, 2019], Shimadzu Corporation, Internet Non Patent Literature 3: Alec Radford and two others, "Unsupervised Representation Learning with Deep Convolutional Generative Adversarial Networks", [online], [searched on Dec. 2, 2019], Internet Non Patent Literature 4: Ian J. Goodfellow and seven others, "Generative Adversarial Nets", [online], [searched on Dec. 2, 2019], Internet

SUMMARY OF INVENTION

Technical Problem

In order to improve the detection precision and the precision of an area value or height value in a peak detection method using machine learning, improving the performance of a discriminator generated by learning is important. For this purpose, learning using as much appropriate teacher data as possible is necessary, but actual analysis of the sample and collection of the teacher data take a lot of time and effort. In particular, in a case where the sample is derived from a living body or the like, collecting the sample often takes a lot of labor and time, and preparing a sufficiently large amount of teacher data is difficult.

In general machine learning, a method is also known in which data created by a simulator or the like instead of actual measurement data is used as teacher data. However, creation of simulated data appropriately reflecting variations in actual measurement data is difficult, and in particular, there has been no conventional method or device capable of appropriately simulating a chromatogram waveform or a spectrum waveform obtained by instrument analysis.

The present invention has been made to solve such problems, and a main object of the present invention is to provide a data generation method and device capable of simulatively generating data appropriately reflecting variations in actual measurement data and the like, which can be used when generating a discriminator for peak detection or for evaluating the discriminator.

Another object of the present invention is to provide a discriminator generation method and device capable of obtaining a discriminator capable of precisely detecting a peak and precisely calculating a feature value such as an area value or height value of the peak using such a data generation method or device.

Solution to Problem

One mode of a data generation method according to the present invention made to solve the above problems is a data generation method of simulatively generating data used when creating, by machine learning, a discriminator configured to detect a peak observed in a signal waveform, the data generation method including:

a parameter frequency information acquisition step of acquiring, by a computer, information on frequency of a predetermined shape parameter which characterizes a shape of a signal waveform from a plurality of signal waveforms collected only in a target field of machine learning for creating the discriminator; and a simulated waveform generation step of generating, by a computer, a simulated signal waveform which is able to include overlapping of a plurality of peaks and noise using the information on frequency of the shape parameter, wherein the simulated signal waveform is provided as data for training or evaluating machine learning.

One mode of a data generation device according to the present invention made to solve the above problems is a data generation device configured to perform the data generation method of the above mode, and to simulatively generate data used when creating, by machine learning, a discriminator configured to detect a peak observed in a signal waveform, the data generation device including:

a parameter frequency information acquisition unit configured to acquire information on frequency of a predetermined shape parameter which characterizes a shape of a signal waveform from a plurality of signal waveforms collected only in a target field of machine learning for creating the discriminator; and a simulated waveform generation unit configured to generate a simulated signal waveform which is able to include overlapping of a plurality of peaks and noise using the information on frequency of the shape parameter, wherein the simulated signal waveform is provided as data for training or evaluating machine learning.

One mode of a discriminator generation method according to the present invention made to solve the above problems is a discriminator generation method using the data generation method of the above mode according to the present invention, the discriminator generation method including a learning step of creating, by a computer, a discriminator configured to detect a peak observed in a signal waveform by machine learning using, as data for training, a simulated signal waveform generated in the simulated waveform generation step.

One mode of a discriminator generation device according to the present invention made to solve the above problems is a discriminator generation device using the data generation device of the above mode according to the present invention, the discriminator generation device including a learning unit configured to create a discriminator configured to detect a peak observed in a signal waveform by machine learning using, as data for training, a simulated signal waveform generated by the simulated waveform generation unit.

In the present invention, a "signal waveform" is a waveform obtained by analysis or measurement on a sample or an object to be measured, and is typically a chromatogram waveform or a spectrum waveform in which a peak corresponding to a component (compound, element, or the like) in a sample is observed, which is obtained by a chromatograph, a mass spectrometer, a nuclear magnetic resonator, an optical analyzer, an X-ray analyzer, or the like.

Advantageous Effects of Invention

The data generation method and device of the above mode according to the present invention, for example, learn a distribution (probability distribution) of variation in a shape parameter of peaks observed on signal waveforms using a generative adversarial network (hereinafter referred to as "GAN"), which is a method of machine learning disclosed in Non Patent Literatures 3 and 4. At the time of learning by the GAN, for example, a shape parameter extracted from a chromatogram waveform obtained by actually analyzing a sample with a chromatograph is given as real data. In the course of learning by the GAN, a generation model (generator) reflecting the frequency (distribution) of the shape parameter can be acquired.

The shape parameter mentioned here can include, for example, a peak height, a peak width, a tailing degree, a leading degree, and the like. The shape parameter can also include the number of peaks, the distance between adjacent peaks, the position of a peak near the center of a signal waveform, and the like. In general, in peak detection using fitting, an exponential modified Gaussian (EMG) function is often used as a peak model function. The reason is that although a peak waveform in a chromatogram is ideally close to the Gaussian waveform, the peak waveform is often asymmetric due to leading and tailing in practice. Therefore, for example, an EMG function can be used as the peak model function, and a parameter (for example, a tailing parameter) of the function can be used as one of the shape parameters.

The adversarial learning does not necessarily need to use a neural network (that is, a GAN does not need to be used), and instead of the neural network, an algorithm that outputs a function capable of approximating the distribution of the data on the basis of the data to be learned may be used.

In addition, even if the analysis and measurement methods are the same, the shape of the peak may be greatly different depending on the sample to be analyzed or the type (category) of components contained in the sample. If a plurality of signal waveforms having greatly different peak shapes are used as real data for learning by the GAN, learning is not appropriately performed, and it is difficult to obtain a generation model with high precision as a target. Therefore, in the present invention, not by using general-purpose analysis that does not limit the type of sample and the like, but by limiting the type of sample and the type of component, the purpose of analysis, the application field, and the like to some extent, learning of the GAN is executed in which signal waveforms having close tendencies of peak shapes, that is, having a certain degree of uniformity, are used as real data.

According to the data generation method and device of the above mode according to the present invention, for example, the distribution of the shape parameter in the chromatogram waveform actually obtained by the chromatograph can be acquired with high precision. Use of the generation model reflecting such distribution enables simulative generation of a signal waveform in which a peak having a reasonable parameter variation appears, a signal waveform in which a plurality of peaks overlap, a signal waveform in which noise is superimposed on a peak, or the like. In such a simulated signal waveform, peak information such as each peak start point and end point is accurately obtained. Therefore, by using such a simulated signal waveform as teacher data or data for evaluation when a discriminator for peak detection is generated by machine learning, it is possible to improve performance of the discriminator for peak detection while saving labor and time.

According to the discriminator generation method and device of the above mode according to the present invention, it is possible to detect a peak with high precision and calculate a feature value such as an area value or height value of the peak with high precision. As a result, a peak that cannot be appropriately detected by a conventional peak detection method can be detected, and the precision in the quantitative determination of a component using the area value of the peak and the like can be improved.

DESCRIPTION OF EMBODIMENTS

Hereinafter, an example of a data generation device according to the present invention and a discriminator generation device using the data generation device will be described with reference to the accompanying drawings.

In the following example, a signal waveform to be analyzed is a chromatogram waveform, and a peak observed on a chromatogram is detected by data analysis, and a position (retention time) of a peak top of the peak and an area value (or height value) of the peak are obtained.

Overall Configuration and Schematic Operation of LC of One Embodiment

Figure 1:
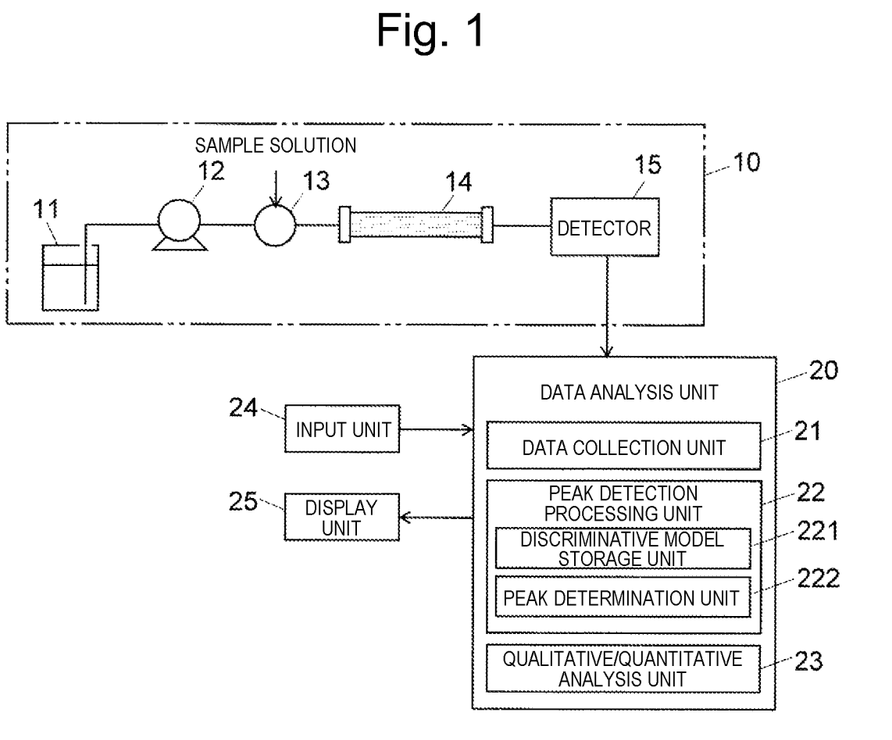
FIG. 1 is a schematic configuration diagram of an embodiment of an LC using a data generation method according to the present invention.

FIG. 1 is a schematic configuration diagram of an embodiment of an LC using a data generation device according to the present invention.

In FIG. 1, a measurement unit 10 includes a mobile phase container 11, a pump 12 that sucks a mobile phase and feeds the mobile phase at a substantially constant flow rate (or flow velocity), an injector 13 that injects a sample solution into the mobile phase, a column 14 that separates components contained in the sample solution according to a retention time, and a detector 15 that detects components in an eluate eluted from the column 14. As the detector 15, for example, an optical detector such as a photodiode array (PDA) detector, a mass spectrometer, or the like can be used.

The data analysis unit 20 has a function of digitizing and processing a detection signal output from the detector 15, and includes functional blocks such as a data collection unit 21, a peak detection processing unit 22, and a qualitative/quantitative analysis unit 23. The peak detection processing unit 22 includes functional blocks such as a discriminative model storage unit 221 and a peak determination unit 222. The discriminative model storage unit 221 stores a discriminative model for peak detection generated in advance by machine learning. An input unit 24 and a display unit 25 are connected to the data analysis unit 20, as user interfaces.

In general, the entity of the data analysis unit 20 is a general-purpose personal computer, and the functions of the respective functional blocks as shown in FIG. 1 can be achieved by executing dedicated software (computer program) installed in the computer by the computer.

In this LC, the pump 12 sucks the mobile phase stored in the mobile phase container 11 and feeds the mobile phase to the column 14 at a substantially constant flow rate. The injector 13 injects a predetermined amount of the sample solution prepared in advance into the mobile phase at a predetermined timing according to an instruction from a control unit (not shown). The injected sample solution is carried by the flow of the mobile phase and introduced into the column 14. Various components contained in the sample solution are temporally separated from each other and eluted while the sample solution is passing through the column 14. The detector 15 detects a component contained in the eluate and outputs a detection signal having an intensity corresponding to the amount of the component from moment to moment.

In the data analysis unit 20, the data collection unit 21 samples the detection signal at predetermined time intervals, converts the detection signal into digital data, and stores the digital data in a storage device. The stored data is data (chromatogram data) constituting a chromatogram waveform, and the component detected by the detector 15 is observed as a peak on the chromatogram. The peak detection processing unit 22 receives the chromatogram data, detects a significant peak, and obtains a position (time) of a peak top of the peak detected and an area value (or height value) of the peak. The qualitative/quantitative analysis unit 23 specifies a component from information on the position of each peak on the chromatogram, and calculates the content of each component from the area value (or height value) of the peak using a calibration curve created in advance. That is, the qualitative/quantitative analysis unit 23 performs qualitative and quantitative determination of each component contained in the sample, and outputs the result to the display unit 25.

Peak Detection Method and Peak Feature Value Calculation Method

In the LC of the present embodiment, a discriminative model generated by machine learning is used to detect a peak appearing in a chromatogram to be analyzed and obtain an area value of the peak as a feature value of the peak.

Figure 4:
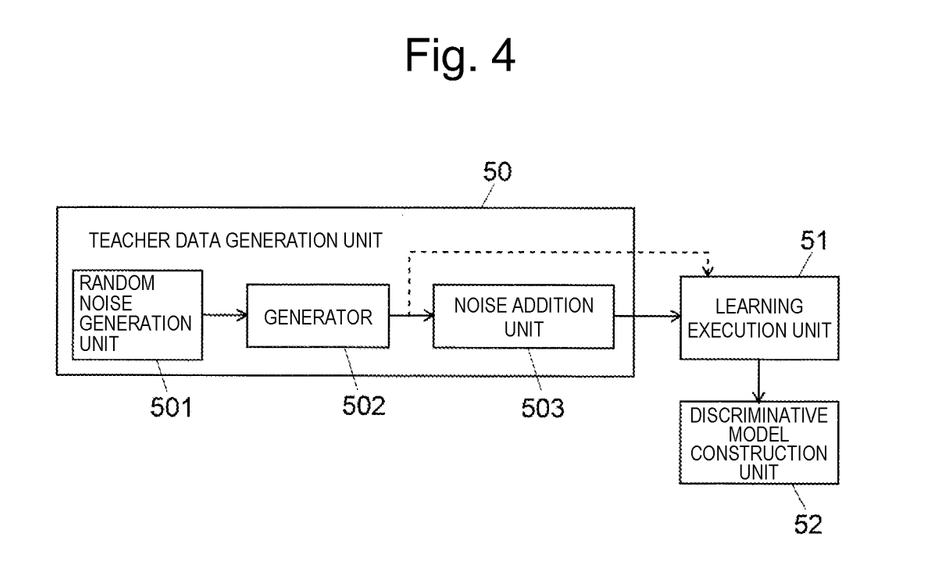
FIG. 4 is a functional block configuration diagram of a learning device that generates a discriminator used in the LC shown in FIG. 1.

FIG. 4 is a block configuration diagram of a learning device used to create a discriminative model.

The learning device includes a teacher data generation unit 50, a learning execution unit 51, and a discriminative model construction unit 52. The teacher data generation unit 50 includes a random noise generation unit 501, a generator 502, and a noise addition unit 503 as lower functional blocks. As the generator 502, a generator 41 created by learning using a GAN is used as described later. The entity of the above-described learning device is a computer, and the functional blocks shown in FIG. 4 are embodied by executing a predetermined program installed in the computer.

In general, when a discriminative model for peak detection is created by machine learning, either supervised learning or semi-supervised learning is performed using teacher data to which an operator has given a label (correct answer information) in advance. The label is an accurate peak top position (time), an area value or height value of the peak, or the like. However, manual labelling work added to the creation of the discriminative model may not only take time and effort, but also involve a risk that erroneous labeling may be performed and the learning effect may be deteriorated. In order to avoid such risks, a method of performing learning using, as teacher data, simulation data whose correct answer is known in advance is known. The teacher data generation unit 50 in the learning device shown in FIG. 4 is a waveform simulator for simulatively generating such teacher data.

Generation Method of Discriminative Model for Peak Detection

Next, a method of creating the generator 502 will be described.

The peak waveform corresponding to the component in the sample in the chromatogram can be expressed by a function f(t,Z) having a shape parameter Z and a retention time t as arguments. Here, the shape parameter Z is, for example, a width of a peak, a degree of tailing, or the like. In general, an EMG function or the like is used as a model function for a peak waveform observed in a chromatogram. Therefore, by using an EMG function as the model function, the distribution of a shape parameter of the function can be learned. However, here, a case will be described as an example in which a model function and the distribution of a shape parameter of the model function according to the characteristics and the like of a chromatograph or an application field of analysis are obtained by using a method of simultaneously learning a function itself representing a peak waveform and a distribution of the shape (distribution of the shape parameter) that the function can have, without using such an explicit model function.

Figure 2:
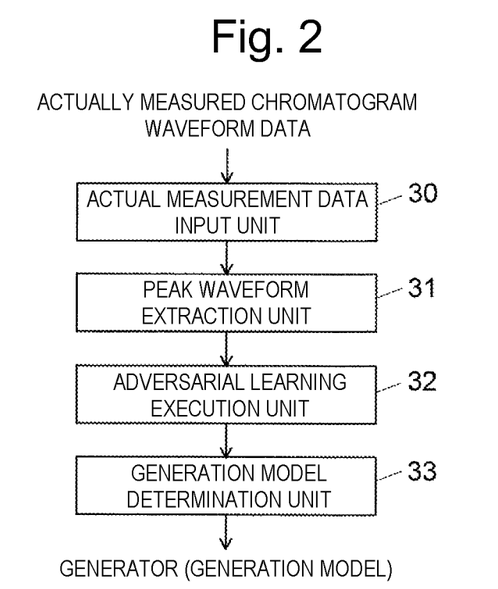
FIG. 2 is a functional block configuration diagram of an embodiment of a data generation device according to the present invention.
Figure 3:
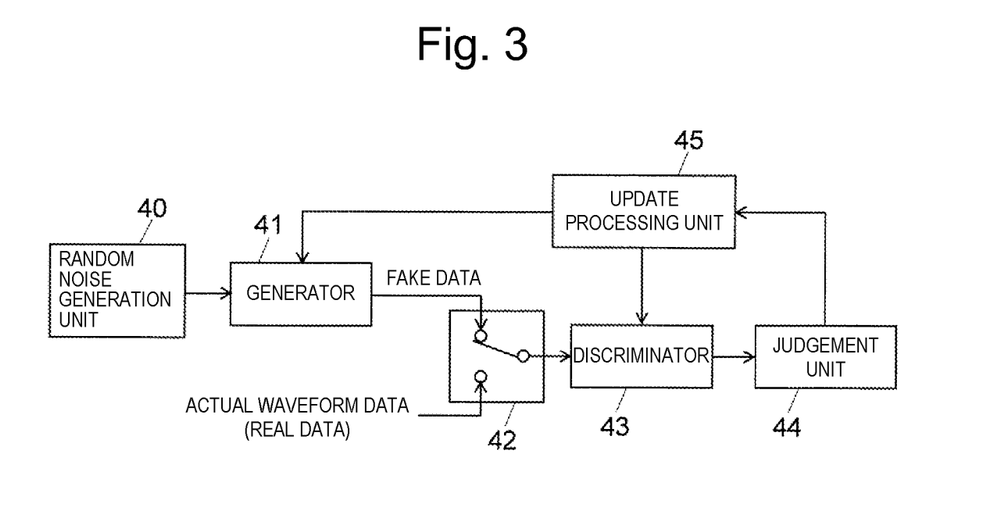
FIG. 3 is a functional block configuration diagram of an adversarial learning execution unit in the data generation device shown in FIG. 2.

FIG. 2 is a schematic configuration diagram of an embodiment of a waveform information estimation device that estimates a peak model function and a shape parameter distribution. The device includes functional blocks such as an actual measurement data input unit 30, a peak waveform extraction unit 31, an adversarial learning execution unit 32, and a generation model determination unit 33. The entity of the device is a computer, and the functional blocks shown in FIG. 2 are embodied by executing a predetermined program installed in the computer. FIG. 3 is a functional block configuration diagram of a GAN used in the adversarial learning execution unit 32 in FIG. 2. These devices may be included in the data analysis unit 20 of the LC shown in FIG. 1, but may be separate from the data analysis unit 20.

In the waveform information estimation device shown in FIGS. 2 and 3, a chromatogram waveform obtained by actual measurement is used as real data at the time of adversarial learning by the GAN. That is, a chromatogram waveform acquired by actually measuring a sample with the measurement unit 10 of the LC shown in FIG. 1 or an LC equivalent to the LC is used as real data. However, even in the case of the peak waveform on the chromatogram, a large difference may occur in the peak waveform shape depending on the type of the sample, that is, the type of the component, the application field and purpose of the analysis, the LC separation condition, and the like. Specifically, when both a case where tailing tends to increase and a case where tailing hardly appears are to be analyzed, there arises a problem in that the width of the distribution of the shape parameter is too wide and the precision of the distribution is reduced. Therefore, such a problem can be avoided by narrowing down the application field of analysis and the like.

Specifically, here, the field to be analyzed is limited to the analysis of biologically derived metabolites. That is, the sample is a biological sample and the component in the sample is a metabolite. This is of course just one example, and the technique described here can be applied to various samples, components, or analytical purposes.

In the device shown in FIG. 2, the actual measurement data input unit 30 reads a lot of chromatogram data obtained by actual measurement. The peak waveform extraction unit 31 extracts the peak with a good waveform shape by removing, for example, the peak with extremely low SN ratio or the peak with insufficient separation on each input chromatogram data. Then, the peak waveform extraction unit 31 obtains at least one peak shape parameter related to the extracted peak, such as degree of tailing (or leading), a peak width, or an SN ratio of the peak. In addition, at least one of the number of peaks in the chromatogram waveform, the position of a peak near the center of the waveform on the time axis, the distance between adjacent peaks, and the like is also obtained as a characteristic shape parameter of the chromatogram waveform that may include a plurality of peaks instead of the shape of the single peak. The latter shape parameter is used to determine the position of the peak in the chromatogram waveform.

For example, when a correlation between parameters can be predicted, such as when there is a proportional relationship between the retention time and peak width, to facilitate the learning described below, normalization processing, such as normalizing the peak width by the retention time in advance, can be performed in advance to weaken the correlation between the parameters.

In this way, the peak waveform extraction unit 31 acquires shape parameters of a large number of single peak waveforms and shape parameters characterizing chromatogram waveforms. The adversarial learning execution unit 32 performs learning by the GAN with a single peak having a good waveform shape as real data. As shown in FIG. 3, the adversarial learning execution unit 32 includes a random noise generation unit 40, a generator 41, a data selection unit 42, a discriminator 43, a judgement unit 44, and an update processing unit 45. Here, neural networks as described in Non Patent Literatures 3 and 4 are used for both the generator 41 and the discriminator 43.

At the time of learning, the generator 41 creates, by the neural network, a function that takes time as an argument for generating fake data, that is, a fake peak waveform, on the basis of noise input from the random noise generation unit 40. Then, by giving an input indicating a time (passage of time) to the created function, fake peak waveform data having the same length as the observation data (real data) is generated. The data selection unit 42 alternately switches between the fake peak waveform data output from the generator 41 and the real data and inputs the data to the discriminator 43. The discriminator 43 discriminates whether the input data is real. The judgement unit 44 judges whether the discrimination result is correct, that is, when real data is input to the discriminator 43, the judgement unit 44 judges whether the data is discriminated as real, and meanwhile, when fake data is input to the discriminator 43, the judgement unit 44 judges whether the data is discriminated as fake.

Based on the judgement result by the judgement unit 44, the update processing unit 45 updates a coefficient of the neural network such that the performance of each of the generator 41 and the discriminator 43 improves. As is well known, while making the generator 41 and the discriminator 43 compete in this way, the GAN performs learning so as to improve the performance of the generator 41 and the discriminator 43. Specifically, while the neural network in the generator 41 is caused to learn so as to generate a function capable of generating fake data as close as possible to the real data, the neural network in the discriminator 43 is caused to learn so as to correctly discriminate between the real data and the fake data.

By learning in the GAN as described above, the generator 41 generates a peak waveform that is very close to a real peak waveform. In the learning process, a generation model including a model function that approximates the peak waveform and a distribution of parameters of the function is obtained. The generation model determination unit 33 determines a generation model for simulatively generating a peak waveform on the basis of a result of performing learning in the GAN as described above by the adversarial learning execution unit 32. This generation model is not only the generator 41 itself but also waveform information that includes a model function representing a peak waveform shape and a distribution of a shape parameter of the model function.

Figure 5:
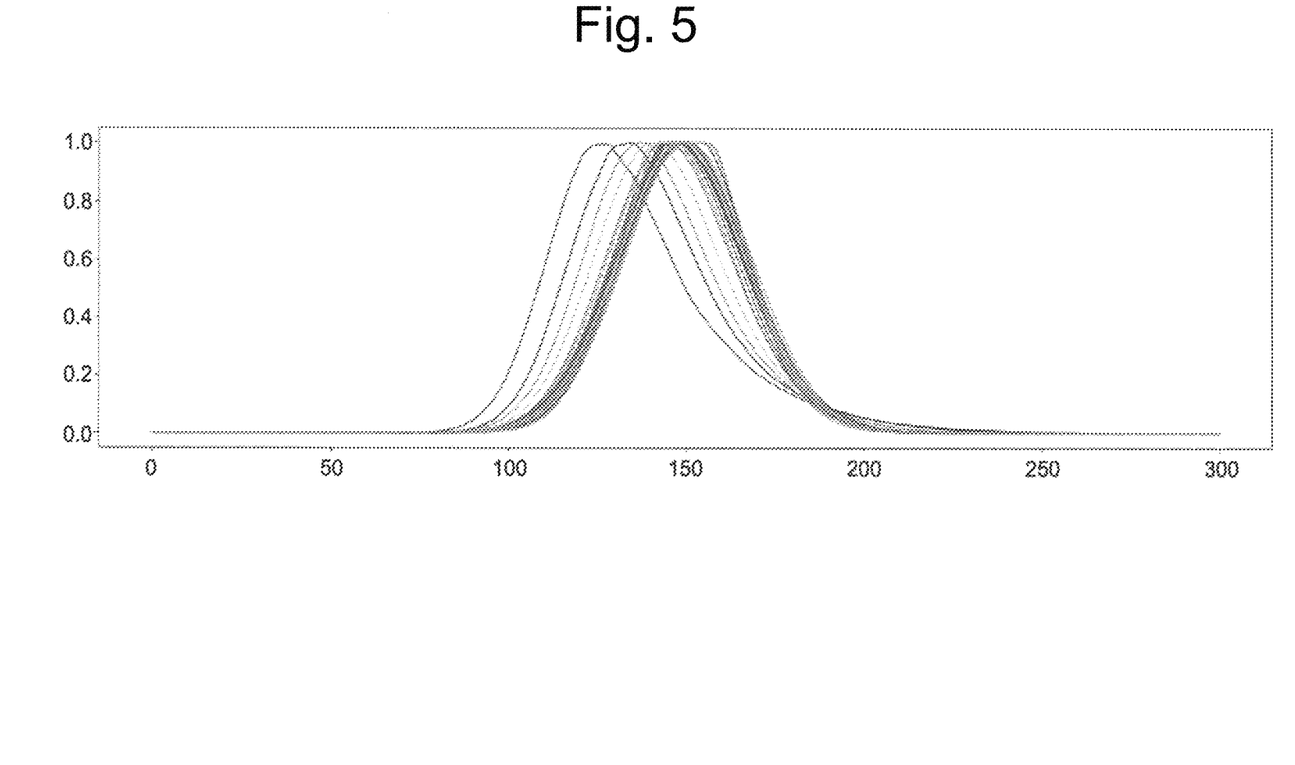
FIG. 5 is a diagram showing an example of input data (real data) of a GAN.
Figure 6:
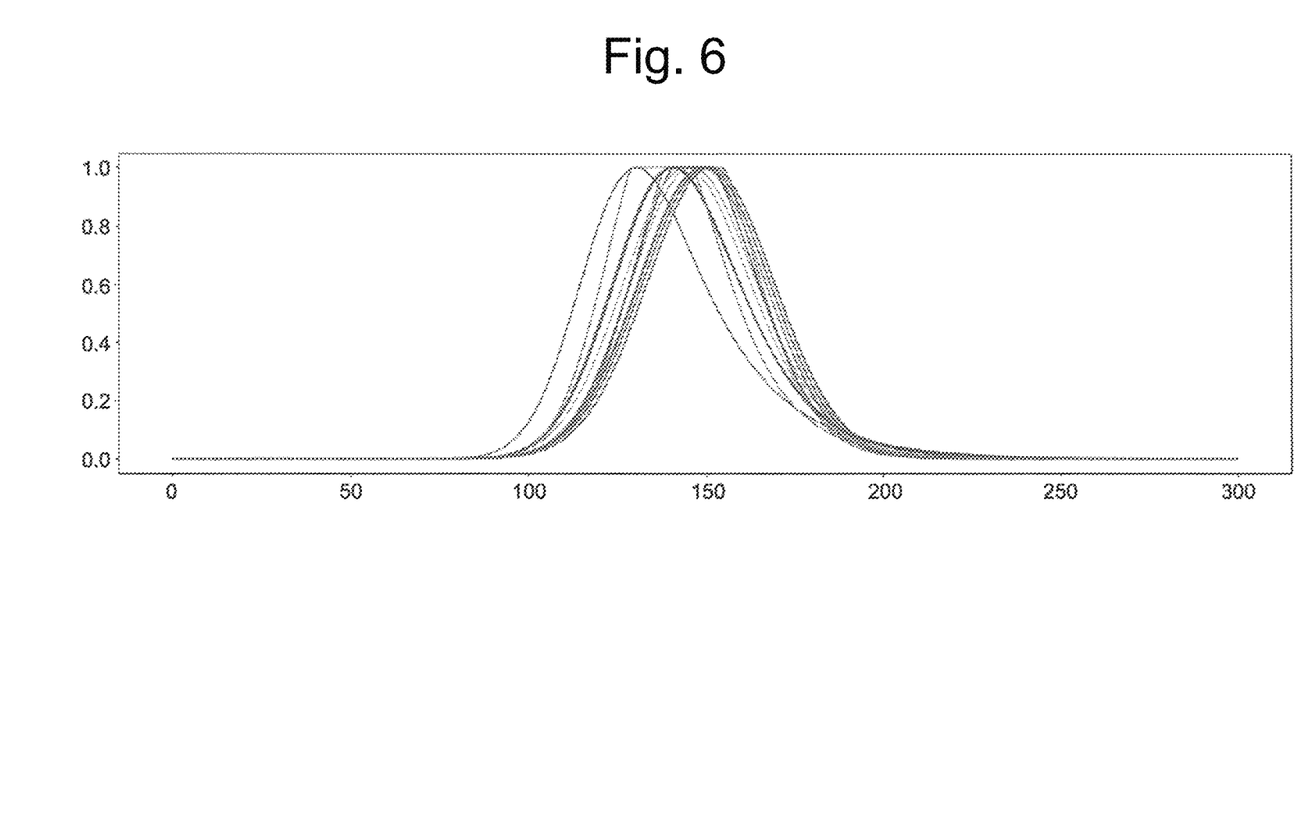
FIG. 6 is a diagram showing an example of output data (fake data) of the GAN.

FIG. 5 is a diagram showing part of real data used for learning by the GAN. On the other hand, FIG. 6 is a diagram showing part of fake data generated by the generator 41. As can be seen by comparing these waveforms, by performing learning by the GAN after giving an appropriate number and quality of real data, it is possible to obtain a generation model that can output fake data extremely close to (substantially indistinguishable from) the real data.

A generally known GAN obtains an output with respect to an input that is a fixed-length vector. However, in a case where the input is a fixed-length vector, when a peak width greatly fluctuates, for example, a troublesome process of performing scaling to adjust the vector lengths is required. In general, the shape of a peak waveform has a strong constraint that the differential value is continuously monotonous. However, since the constraint cannot be used for learning, the initial value of a waveform generated by the generator 41 is significantly different from the original shape of the peak. As a result, there is a high possibility that a long learning time is required until a peak waveform having an appropriate shape can be output. As described above, it is empirically known that learning by the GAN fails when the output of the generator 41 takes time to form the shape of data to be learned.

Therefore, in order to avoid such a situation, the neural network included in the generator 41 may create a function s(t,Z) that returns a distorted time, and the generator 41 may generate a function called Gauss(s(t,Z)) using this function. Note, t having the same size as the vector size of the real data is input as the argument t of these functions, and data having the same size as the size of a waveform vector to be learned is generated. Of course, a general Gauss function or EMG function can be used in the neural network included in the generator 41.

As a result, it is possible to learn the distribution of the temporal distortion parameter function s(t,Z) while directly learning the distribution of the waveform vector. That is, in a general GAN, can perform only "vector" to "vector" learning, whereas in the method of the present invention, the GAN is extended so that the GAN can perform "time-series function" to "vector" learning.

More preferably, to obtain the distribution indicated by s(t,Z) t, skipped connection may be used for the network of the function s(t,Z), or assuming s(t,Z)=t+s'(t,Z), initial value distribution of network weight parameters may be adjusted such that s'(t,Z) takes a value near 0 with an appropriate width.

It is considered that there is distortion that is substantially uniformly applied to intensity, such as a heavy foot of the bell-shaped function. In that case, it is also useful to use the intensity correction neural network function i(y) and use the function i(Gauss(s(t,Z))) as the generator 41.

Meanwhile, a general neural network may be used as the discriminator 43, but here, to better capture a bell-shaped waveform such as the Gaussian function, the neural network having a one-dimensional convolutional layer and a linear combination layer is used.

In the above description, the essential purpose of the adversarial learning execution unit 32 is to learn a distribution that matches the distribution of the data point group, and in the above example, the GAN is used as the learning technique. As described in Non Patent Literatures 3 and 4, it is common to use a neural network in the GAN, but as is apparent from the description in Non Patent Literature 3, instead of a neural network, an appropriate algorithm that can optimize a function using differentiation (gradient) can be used.

Here, the Kullback-Leibler (KL) distance is used as the similarity to the distribution of the function f generated from the observed waveform D and the shape parameter Z. In addition to the KL distance, various indicators for evaluating the degree of matching of distributions, such as Jensen-Shannon (JS) distance and Wasserstein distance, can be used.

As described above, it is possible to acquire the generation model that simulatively generates the waveform on the basis of the peak waveform observed on the actually measured chromatograph. In other words, the model function and the distribution information on the shape parameter can be acquired.

The generator 502 shown in FIG. 4 uses the above-described generation model, and outputs a fake waveform having a shape very close to the peak waveform on the chromatogram on the basis of the input noise. This fake waveform is created by using the model function f(t,Z), and deforming the shape parameter of the model function according to a predetermined probability distribution. In the learning device, noise generated by the random noise generation unit 501 is input to the generator 502, and the peak waveform of the shape according to the distribution of the shape parameter is obtained as described above.

Figure 7A:
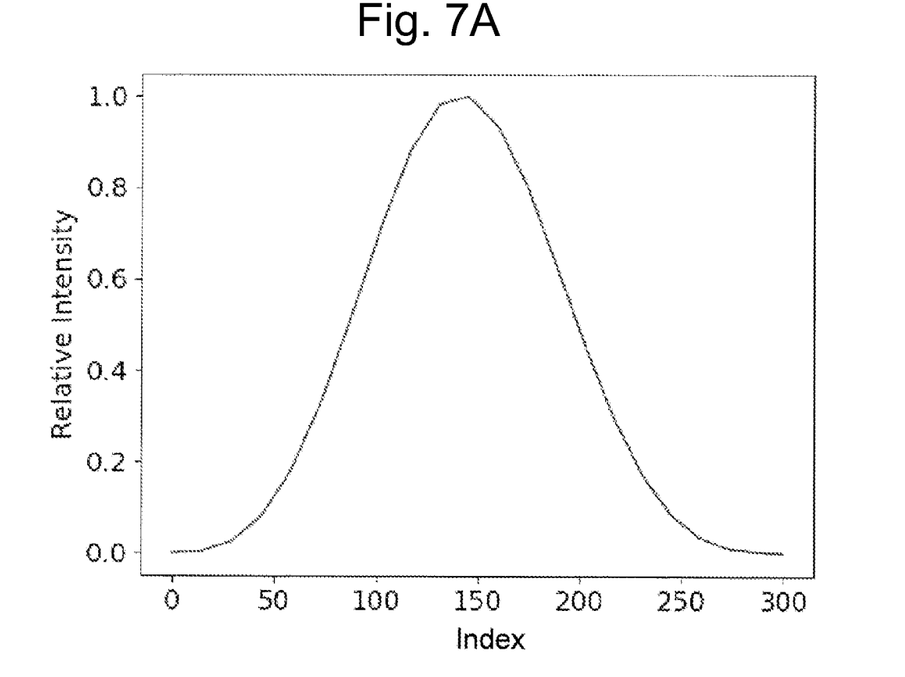
FIGS. 7A and 7B are diagrams showing examples of generation results of peak waveforms.
Figure 7B:
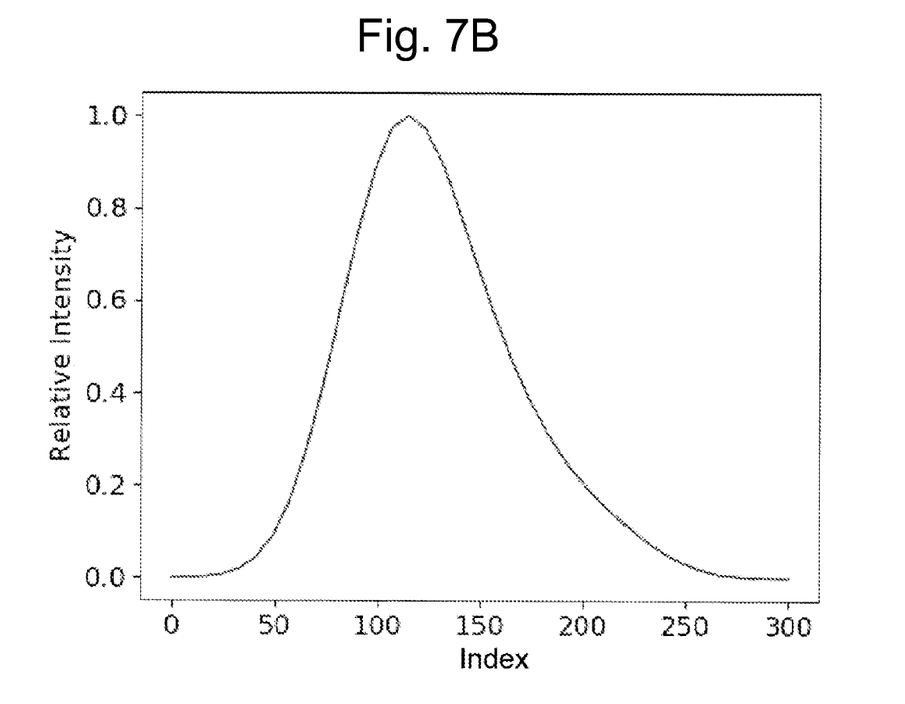

FIGS. 7A and 7B are examples of a shape of a single peak waveform generated by the generator 502. Since the shape of the peak waveform is obtained in the form of a function using time as an argument, the peak width and height can be freely changed.

The noise addition unit 503 adds an appropriate background noise component to the peak waveform to obtain teacher data. On the other hand, since the peak before the noise addition is the correct answer peak waveform, the peak before the noise addition is a label corresponding to the teacher data.

The generator 502 has, as information, the probability distribution of the shape parameter that accurately reflects the shape change of the actually measured peak waveform, and can therefore output a waveform that accurately simulates the change of the peak shape corresponding to the intended analysis field. Of course, there is no restriction on the number of waveforms to be generated in the teacher data generation unit 50. Therefore, in the learning device shown in FIG. 4, a high-performance discriminative model can be efficiently constructed by learning using a large number of pieces of good teacher data. The discriminative model created as above is stored in the discriminative model storage unit 221 of the LC according to the present embodiment. As a result, the LC of the present embodiment can accurately detect a peak observed in a chromatogram obtained by measurement, and can also precisely calculate a feature value such as an area value or height value of the peak.

Figure 8A:
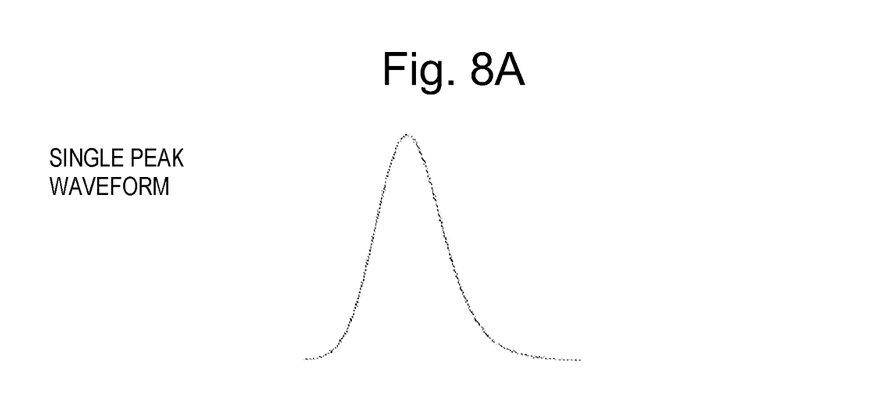
FIGS. 8A, 8B, and 8C are waveform diagrams for explaining the operation of a waveform simulator.
Figure 8B:
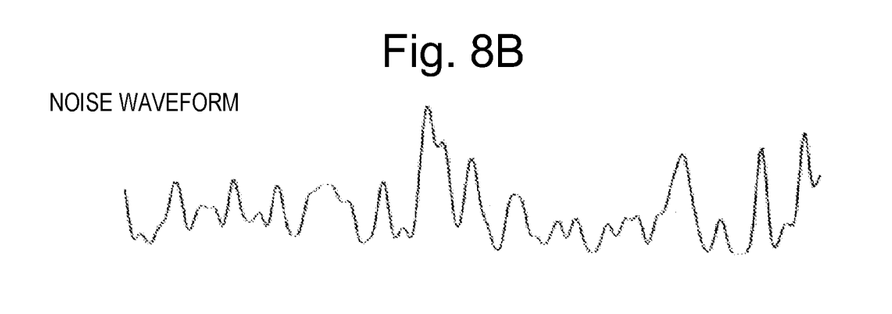
Figure 8C:
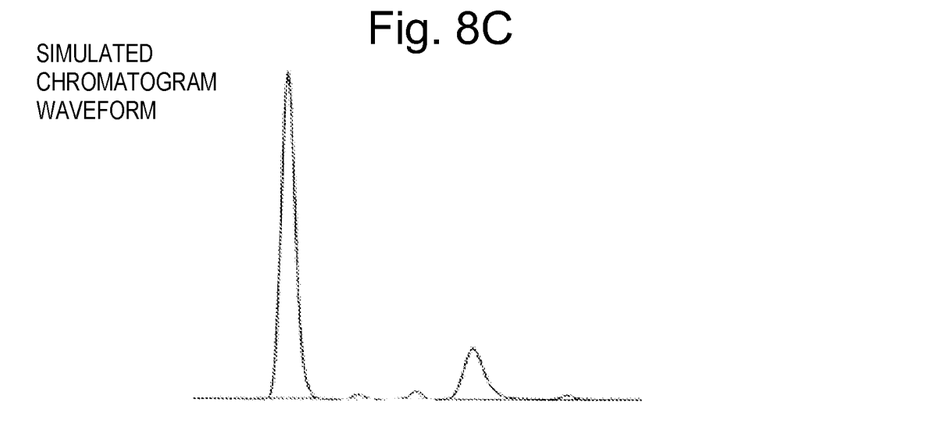

When the teacher data generation unit 50 shown in FIG. 4 generates, as teacher data, a simulated chromatogram waveform in which a plurality of peaks are observed, the generator 502 generates a plurality of peaks based on a predetermined peak shape distribution as shown in FIG. 8A. Similarly, the number of peaks and the positions of the respective peaks are determined on the basis of the distribution of shape parameters such as the number of peaks obtained from given data, the positions of peaks near the center of the waveform on the time axis, and the distance between adjacent peaks, so that a mixed peak waveform combining a plurality of peaks is formed. Background noise (see FIG. 8B) based on the distribution of the shape parameters such as an SN ratio is added to the mixed peak waveform to generate a simulated chromatogram waveform as shown in FIG. 8C. By using such a chromatogram waveform as teacher data, it is possible to construct a discriminative model that can detect a plurality of overlapping peaks and can output feature amounts such as area values or height values of the plurality of peaks.

The teacher data generation unit 50 can be used not only to generate teacher data at the time of learning but also to generate evaluation data to be used when evaluating (or testing) a discriminative model created by learning.

In general, a sufficiently large amount of teacher data is required for learning a peak waveform shape. Therefore, learning of the peak waveform shape may be executed using data obtained for samples in a considerably wide field (target). For example, in the case of an LC, data obtained by analysis on general biological samples may be used for learning instead of analysis on a specific substance for a specific biological sample such as blood or urine. That is, a data set in a wider field than a field to which the peak detection according to the present invention is actually applied may be included in the teacher data. In this case, it is naturally conceivable to expand the data so as to simulate only the vicinity of the parameter point corresponding to the sample data in the field to be actually applied. That is, it is possible to learn the distribution of the peak shape parameters for a wide field, check in which range in the peak shape parameter distribution the peak group for a target sample in a narrow field is concentrated, and create simulation data on the basis of the shape parameter distribution limited to the range.

As described above, in actual application, it is often necessary to handle mixed peaks where the feet of adjacent peaks overlap. However, it can be considered that linearity in analysis is ensured in many analysis devices such as the LC and the GC. Therefore, when the analysis target is a chromatogram waveform, the signal value of the mixed peak may be simple addition of signal values corresponding to a plurality of single peaks.

The above embodiment is an example in which the present invention is applied to an LC, but it is obvious that the present invention can be applied when processing or analyzing signal waveforms obtained by various analysis devices other than the LC and the GC.

Specifically, the present invention can also be used for peak detection of a mass spectrum obtained by a mass spectrometer, a nuclear magnetic resonance spectrum obtained by a nuclear magnetic resonator, an optical spectrum such as an absorption spectrum or a reflection spectrum obtained by an optical analyzer, an X-ray energy spectrum obtained by an X-ray analyzer, and the like.

VARIOUS MODES

It will be understood by those skilled in the art that the exemplary embodiments described above are specific examples of the following modes.

(Clause 1) One mode of a data generation method according to the present invention is a data generation method of simulatively generating data used when creating, by machine learning, a discriminator configured to detect a peak observed in a signal waveform, the data generation method including:

a parameter frequency information acquisition step of acquiring, by a computer, information on frequency of a predetermined shape parameter which characterizes a shape of a signal waveform from a plurality of signal waveforms collected only in a target field of machine learning for creating the discriminator; and a simulated waveform generation step of generating, by a computer, a simulated signal waveform which is able to include overlapping of a plurality of peaks and noise using the information on frequency of the shape parameter, in which the simulated signal waveform is provided as data for training or evaluating machine learning.

(Clause 2) In the data generation method according to Clause 1, the parameter frequency information acquisition step may include acquiring a generation model including information on frequency of a shape parameter by using, as an input, a shape parameter obtained from each of the plurality of signal waveforms, and executing adversarial learning using two models that oppose each other, the two models being a generation model and a discriminative model, and the simulated waveform generation step may include generating a simulated signal waveform by using the generation model.

(Clause 9) One mode of a data generation device according to the present invention is a data generation device configured to simulatively generate data used when creating, by machine learning, a discriminator configured to detect a peak observed in a signal waveform, the data generation device including:

a parameter frequency information acquisition unit configured to acquire information on frequency of a predetermined shape parameter which characterizes a shape of a signal waveform from a plurality of signal waveforms collected only in a target field of machine learning for creating the discriminator; and a simulated waveform generation unit configured to generate a simulated signal waveform which is able to include overlapping of a plurality of peaks and noise using the information on frequency of the shape parameter, in which the simulated signal waveform is provided as data for training or evaluating machine learning.

(Clause 10) In the data generation device according to Clause 9, the parameter frequency information acquisition unit may be configured to acquire a generation model including information on frequency of a shape parameter by using, as an input, a shape parameter obtained from each of the plurality of signal waveforms, and executing adversarial learning using two models that oppose each other, the two models being a generation model and a discriminative model, and the simulated waveform generation unit may be configured to generate a simulated signal waveform by using the generation model.

The data generation method according to Clauses 1 and 2 and the data generation device according to Clauses 9 and 10 can acquire with high accuracy, for example, a model function for simulating with high precision a chromatogram waveform obtained by a chromatograph, and shape parameters of the model function, for example, distribution information such as a tailing degree of a peak and a peak width. As a result, the data generation method and the data generation device can freely generate a simulated signal waveform that accurately reflects variation in an actually obtained signal waveform and in which peak information such as each peak start point and end point is accurately obtained. Therefore, the performance of the discriminator for detecting the peak observed in the signal waveform can be improved while saving labor and time for creating teacher data and the like.

(Clause 3) In the data generation method according to Clause 1 or 2, the parameter frequency information acquisition step may include extracting a peak isolated from a signal waveform and having an SN ratio equal to or higher than a reference value, and acquiring a shape parameter related to the peak.

(Clause 11) Similarly, in the data generation device according to Clause 9 or 10, the parameter frequency information acquisition unit may be configured to extract a peak isolated from a signal waveform and having an SN ratio equal to or higher than a reference value, and to acquire a shape parameter related to the peak.

The data generation method according to Clause 3 and the data generation device according to Clause 11 can improve the precision of a generation model obtained by adversarial learning by a GAN or the like.

(Clause 4) In the data generation method according to Clause 3, the shape parameter related to the peak may include any one of a peak height, a peak width, and a tailing degree of the peak.

(Clause 12) In the data generation device according to Clause 11, the shape parameter related to the peak may include any one of a peak height, a peak width, and a tailing degree of the peak.

The data generation method according to Clause 4 and the data generation device according to Clause 12 can improve the precision of the generation model by causing learning of the shape parameter related to the appropriate peak.

(Clause 5) In the data generation method according to any one of Clauses 1 to 4, the shape parameter may include the number of peaks, the distance between adjacent peaks, and the position of a peak near the center of a signal waveform, and the simulated waveform generation step may include determining a peak position in a simulated signal waveform on the basis of information on frequency of the shape parameters.

(Clause 13) In the data generation device according to any one of Clauses 9 to 12, the shape parameter may include the number of peaks, the distance between adjacent peaks, and the position of a peak near the center of a signal waveform, and the simulated waveform generation unit may be configured to determine a peak position in a simulated signal waveform on the basis of information on frequency of the shape parameters.

The data generation method according to Clause 5 and the data generation device according to Clause 13 can generate a signal waveform that precisely simulates overlapping of a plurality of peaks or the like.

(Clause 6) In the data generation method according to any one of Clauses 1 to 5, the simulated waveform generation step may include generating a simulated signal waveform by adding noise to a waveform including one or a plurality of peaks generated using the generation model.

(Clause 14) In the data generation device according to any one of Clauses 9 to 13, the simulated waveform generation unit may be configured to generate a simulated signal waveform by adding noise to a waveform including one or a plurality of peaks generated using the generation model.

The data generation method according to Clause 6 and the data generation device according to Clause 14 can acquire teacher data that accurately simulates a signal waveform with relatively large noise. As a result, a generation model with high precision in detection of a peak and high precision in calculation of an area value of a peak and the like may be obtained.

(Clause 7) In the data generation method according to any one of Clauses 1 to 6, the plurality of signal waveforms collected only in the target field may be chromatogram waveforms or spectrum waveforms obtained by analysis on a specific type of sample.

(Clause 15) In the data generation device according to any one of Clauses 9 to 14, the plurality of signal waveforms collected only in the target field may be chromatogram waveforms or spectrum waveforms obtained by analysis on a specific type of sample.

The data generation method according to Clause 7 and the data generation device according to Clause 15 can create a generation model with high precision because the variation in the shape parameters of the chromatogram waveforms and the spectrum waveforms is reduced, and may also improve the accuracy of the simulated signal waveform.

(Clause 8) One mode of the invention according to Clause 8 is a discriminator generation method using the data generation method according to any one of Clauses 1 to 7, in which the discriminator generation method may be including a learning step of creating a discriminator configured to detect a peak observed in a signal waveform by machine learning using, as data for training, a simulated signal waveform generated in the simulated waveform generation step.

(Clause 16) One mode of the invention according to Clause 16 is a discriminator generation device using the data generation device according to any one of Clauses 9 to 15, in which the discriminator generation device may be including a learning unit configured to create a discriminator configured to detect a peak observed in a signal waveform by machine learning using, as data for training, a simulated signal waveform generated by the simulated waveform generation unit.

The discriminator generation method according to Clause 8 and the discriminator generation device according to Clause 16 can provide a discriminator that may precisely detect a peak observed in a chromatogram waveform or the like and precisely calculate an area value or height value of the peak. As a result, detection omissions and erroneous detection of peaks can be reduced, and the precision in quantitative determination based on the area value or height value of the peak can be improved.

REFERENCE SIGNS LIST

10 . . . Measurement Unit
11 . . . Mobile Phase Container
12 . . . Pump
13 . . . Injector
14 . . . Column
15 . . . Detector
2 . . . Peak Detection Processing Unit
20 . . . Data Analysis unit
21 . . . Data Collection Unit
22 . . . Peak Detection Processing Unit
221 . . . Discriminative Model Storage Unit
222 . . . Peak Determination Unit
23 . . . Qualitative/Quantitative Analysis Unit
24 . . . Input Unit
25 . . . Display Unit
30 . . . Actual Measurement Data Input Unit
31 . . . Peak Waveform Extraction Unit
32 . . . Adversarial Learning Execution Unit
33 . . . Generation Model Determination Unit
40 . . . Random Noise Generation Unit
41 . . . Generator
42 . . . Data Selection Unit
43 . . . Discriminator
44 . . . Judgement Unit
45 . . . Update Processing Unit
50 . . . Teacher Data Generation Unit
501 . . . Random Noise Generation Unit
502 . . . Generator
503 . . . Noise Addition Unit
51 . . . Learning Execution Unit
52 . . . Discriminative Model Construction Unit

The invention claimed is:

1. A discriminator creation method comprising:
a step of obtaining a plurality of signal waveforms by measuring a plurality of samples using an analysis device;
a step of extracting a single peak from each of the plurality of signal waveforms, and acquiring a predetermined shape parameter which characterizes a shape of the single peak;
a step of acquiring a generation model including a model function that approximates a peak waveform and a distribution of parameters of the model function by machine learning using the shape parameter;
a step of generating a simulated signal waveform which includes overlapping of a plurality of peaks and/or a peak noise using the generation model; and
a step of creating a discriminator configured to detect a peak observed in a signal waveform obtained by measuring a sample by machine learning using the simulated signal waveform as data for training or evaluating.

2. The discriminator creation method according to claim 1, wherein the step of acquiring a generation model includes acquiring a generation model including a distribution of shape parameters by using the shape parameter as an input and executing adversarial learning using two models that oppose each other, the two models being a generation model and a discriminative model.

3. The discriminator creation method according to claim 1, wherein the step of acquiring a shape parameter includes extracting a single peak isolated from a signal waveform and having an SN ratio equal to or higher than a reference value, and acquiring a shape parameter related to the single peak.

4. The discriminator creation method according to claim 3, wherein the shape parameter includes any one of a peak height, a peak width, and a tailing degree of the peak.

5. The discriminator creation method according to claim 1, wherein the shape parameter includes a number of peaks, a distance between adjacent peaks, and a position of a peak near a center of a signal waveform, and the step of generating a simulated signal waveform includes determining a peak position in a simulated signal waveform on a basis of a distribution of the shape parameters.

6. The discriminator creation method according to claim 1, wherein the step of generating a simulated signal waveform includes generating a simulated signal waveform by adding noise to a waveform including one or a plurality of peaks generated using the generation model.

7. The discriminator creation method according to claim 1, wherein the plurality of signal waveforms are chromatogram waveforms or spectrum waveforms obtained by analysis on a specific type of sample.

8. The discriminator creation method according to claim 1, wherein the step of creating the discriminator includes:
a step of inputting waveform data about the simulated signal waveform to the discriminator;
a step of outputting a discrimination result from the discriminator, the discrimination result indicating whether the waveform data is real or fake;
a step of outputting a judgement result judged by a judgement unit, the judgement result indicating whether the discrimination result is correct; and
a step of updating a parameter in the discriminator or the generation model based on the judgement result.

9. A discriminator creation device comprising:
a parameter information acquisition unit configured to extract a single peak from each of a plurality of signal waveforms obtained by measuring a plurality of samples using an analysis device, and to acquire a predetermined shape parameter which characterizes a shape of the single peak;
a generation model acquisition unit to acquire a generation model including a model function that approximates a peak waveform and a distribution of parameters of the model function by machine learning using the shape parameter;
a simulated waveform generation unit configured to generate a simulated signal waveform which includes overlapping of a plurality of peaks and/or noise using the generation model; and
a discriminator creation unit configured to detect a peak observed in a signal waveform obtained by measuring a sample by machine learning using the simulated signal waveform as data for training or evaluating.

10. The discriminator creation device according to claim 9, wherein the generation model acquisition unit is configured to acquire a generation model including a distribution of shape parameters by using the shape parameter as an input and executing adversarial learning using two models that oppose each other, the two models being a generation model and a discriminative model.

11. The discriminator creation device according to claim 9, wherein the parameter information acquisition unit is configured to extract a single peak isolated from a signal waveform and having an SN ratio equal to or higher than a reference value, and to acquire a shape parameter related to the single peak.

12. The discriminator creation device according to claim 11, wherein the shape parameter includes any one of a peak height, a peak width, and a tailing degree of the peak.

13. The discriminator creation device according to claim 9, wherein the shape parameter includes a number of peaks, a distance between adjacent peaks, and a position of a peak near a center of a signal waveform, and the simulated waveform generation unit is configured to determine a peak position in a simulated signal waveform on a basis of a distribution of the shape parameters.

14. The discriminator creation device according to claim 9, wherein the simulated waveform generation unit is configured to generate a simulated signal waveform by adding noise to a waveform including one or a plurality of peaks generated using the generation model.

15. The discriminator creation device according to claim 9, wherein the plurality of signal waveforms are chromatogram waveforms or spectrum waveforms obtained by analysis on a specific type of sample.

* * * * *